Figures 1, 2:
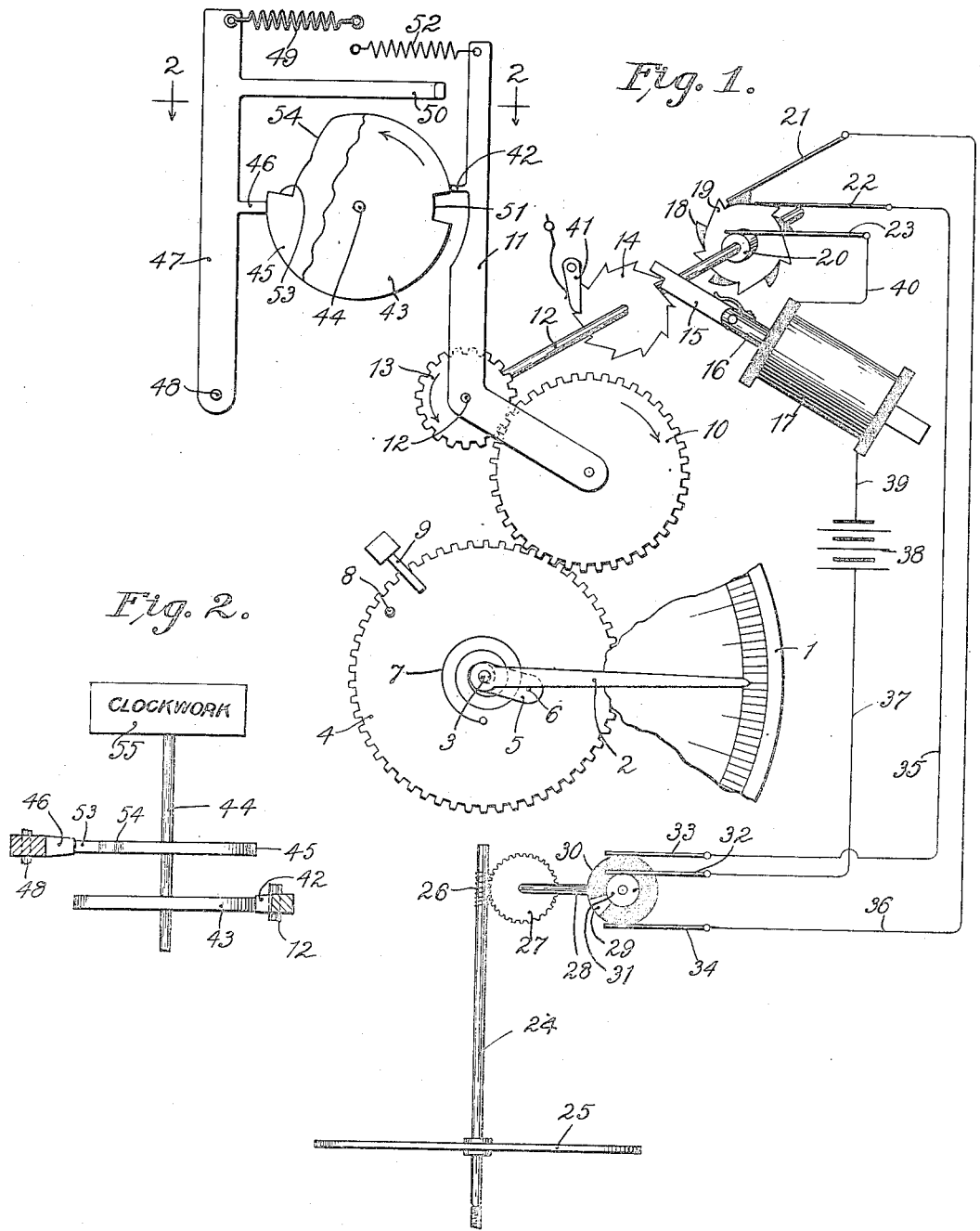

C. I. HALL.
MAXIMUM DEMAND INDICATING INSTRUMENT.
APPLICATION FILED OCT. 27, 1913.

1,214,029. Patented Jan. 30, 1917.

Witnesses:
Leonard E. Bogue
Leonard W. Novander

Inventor
Chester I. Hall
By Brown Williams Bell Hanson & Boettcher
Attorneys.

UNITED STATES PATENT OFFICE.

CHESTER I. HALL, OF CHICAGO, ILLINOIS, ASSIGNOR TO CHICAGO ELECTRIC METER COMPANY, OF CHICAGO, ILLINOIS, A CORPORATION OF ILLINOIS.

MAXIMUM-DEMAND INDICATING INSTRUMENT.

1,214,029.

Specification of Letters Patent. Patented Jan. 30, 1917.

Application filed October 27, 1913. Serial No. 797,422.

*To all whom it may concern:*

Be it known that I, CHESTER I. HALL, a citizen of the United States, residing at Chicago, in the county of Cook and State of Illinois, have invented certain new and useful Improvements in Maximum-Demand Indicating Instruments, of which the following is a full, clear, concise, and exact description, reference being had to the accompanying drawings, forming a part of this specification.

My invention relates to an improved form of maximum indicating instrument for showing the quantity of electric current or energy flowing through a given circuit in one of a succession of time intervals. The mechanism is constructed so that the indicating mechanism will show the highest quantity of current or energy flowing through the measured circuit in one of these intervals.

My invention has for its purpose to secure the results referred to by providing an electricity measuring mechanism with suitable circuit-changing devices adapted to operate electromagnetic mechanism at a distance, which mechanism in turn operates the maximum indicating devices.

My invention has particularly to do with the means employed for permitting the return to zero of the indicator-actuating mechanism at the end of each one of the predetermined time intervals. While I have shown the particular arrangement illustrated in the drawings and described in the specification for actuating the indicating mechanism from the current or energy metering, it will be understood that I do not limit myself to this particular arrangement, as I may employ any equivalent without departing from my present invention.

The several drawings illustrating my invention are as follows:

Figure 1 is a diagrammatic view of the metering mechanism, the maximum indicating devices, and the connections employed for actuating the indicating devices from the metering devices, as well as the mechanism that is employed for determining the time intervals. Fig. 2 is a view of the timing devices taken along the line 2—2 in Fig. 1.

Similar numerals refer to similar parts throughout the several views.

As shown in the drawings, the dial 1 of the maximum indicating mechanism is disposed so that a pointer 2 travels around upon it to indicate the quantity of energy or current integrated during any one of the predetermined time intervals. The pointer 2 is secured by frictional engagement upon a stationary shaft 3 so that it will remain in any position to which it is moved when the driving mechanism is returned to its zero position. A gear 4 is loosely mounted upon the shaft 3 and carries an arm 5, from which a pin 6 projects so as to engage the side of the pointer 2 as the arm is rotated. A spring 7 has its ends secured to the gear 4 and the shaft 3 respectively. A stop pin 8 is carried by the gear 3 which is moved back into engagement with the fixed stop or abutment 9 when the gear 4 is released from its driving gear so that the spring 7 may return the gear 4 and the arm 5 to their zero or initial positions.

The gear 4 is driven by a gear 10 pivotally mounted upon the lower end of a bent lever 11, which lever is pivotally supported upon one end of a shaft 12, to which is rigidly secured a gear 13 meshing with the gear 10. The shaft 12 has rigidly secured to it a ratchet wheel 14 engaged by a spring pawl 15 carried by the movable core 16 of a solenoid 17. The shaft 12 also carries a contact mechanism consisting of two ratchet wheels 18 and 19 of insulating and conducting material, respectively, which are rigidly secured to the shaft, side by side, so that the teeth of one of said ratchet wheels are disposed intermediate the teeth of the other ratchet wheel. The ratchet wheel 19 is provided with a conducting hub 20 in electrical connection with said ratchet wheel. Contact springs 21 and 22 are disposed upon the faces of the teeth of the ratchet wheels 18 and 19, each of these springs being wide enough to extend over the faces of both wheels, and a third contact spring 23 is in contact with the cylindrical surface of the hub 20.

The metering mechanism is represented diagrammatically by a shaft 24 having the usual dampening disk 25 and provided with a worm 26 driving a gear 27 secured to a shaft 28. It will be understood that the shaft 24 represents the shaft of any desired form of integrating electricity meter. The shaft 28 has rigidly secured to it a commutator consisting of a conducting segment 29 and an insulating segment 30. The conducting segment 29 is in electrical contact with a hub 31 extending sidewise from the segments of the commutator so that a contact spring 32 may rest upon it at all times. Contact springs 33 and 34 rest upon the upper and lower surfaces of the commutator, respectively. The spring 33 is connected by a wire 35 with the spring 22 and the spring 34 is connected by wire 36 with the spring 21. The spring 32 is connected by wire 37 with one terminal of the battery 38, the other terminal of which is connected by wire 39 with one terminal of the solenoid 17, the other terminal of which is connected by wire 40 with the spring 23.

As a result of the circuit connections described, when the shaft 24 is rotated sufficiently to bring the conducting segment 29 into engagement with the upper contact spring 33, a circuit is closed from the battery 38 through the solenoid 17 by means of the contact springs 33 and 22. This results in the energization of the solenoid which at once rotates the shaft 12 an amount corresponding to one tooth of the ratchet wheel 14 and, as a result, the gearing above described is rotated and the arm 5 is advanced a proportional amount, carrying with it the pointer 2, assuming that the pointer at the beginning of the operation of the mechanism is in its zero position upon the dial 1. The ratchet wheel 14 is provided with twice as many teeth as either of the ratchet wheels 18 and 19 and is held in any position to which it is advanced by means of a spring-actuated pawl 41. As a result of the advance of the shaft 12 the amount indicated, the tooth of the ratchet wheel 19, which previously rotated under the spring 22, is advanced therefrom and into engagement with the spring 21, and at the same time one of the teeth of the ratchet wheel 18 is brought into engagement with the spring 22 to prevent it engaging the ratchet wheel 19. This results in a quick break of the circuit just closed by the spring 22 and places the spring 21 and spring 32 in position to again close the energizing circuit of the solenoid 17 when the conducting segment 29 is rotated into its lowermost position in engagement with the spring 34. The second closure of the energizing circuit of the solenoid 17 through the wire 36 and the spring 21 results in a second advance of the shaft 12 an amount equal to the first advance thereof, with the result that the ratchet wheels 18 and 19 are caused to occupy the position indicated in Fig. 1 relatively to the contact springs resting upon them.

The lever 11 has extending therefrom, near its upper end, a projecting lug 42 resting upon the periphery of a cam 43 rigidly secured to a time-controlled shaft 44. This shaft has also secured to it a second cam 45, upon which a lug 46, extending from a lever 47, rests. The lever 47 is pivotally supported at its lower end 48 and is provided with a comparatively stiff spring 49 at its upper end for holding the lug firmly against the cam 45. The lever 47 is provided with an arm 50 extending toward and into the path of the upper end of the lever 11 so that when the lug 42 drops into the notch 51 formed in the cam 43, the arm 50 and the upper end of the lever 11 come nearly or quite into engagement as a result of the operation of the comparatively light spring 52 connected with the upper end of the lever 11. This spring 52 is of sufficient strength to move the lever to the left, in the manner indicated, which results in moving the gear 10 from engagement with the gear 4. When this occurs, owing to its released condition, the gear 4 is at once moved backward, together with the arm 5, until the stop 8 is brought into engagement with the stop 9 to prevent further back rotation of the gear 4. The cam 45 is provided with a shoulder 53, from which the lug 46 drops at a very short interval after the lug 42 has dropped into the notch 51, and, when the lug 46 drops from the shoulder 53, the arm 50 engages the lever 11 and the stronger spring 49 moves the lever 11 against the resistance of the weaker spring 52 so as to again bring the gear 10 into mesh with the gear 4. In this manner a brief and definite time interval is provided, during which the gear 4 is entirely free from the driving gear 10 and, therefore, a sufficient time interval is provided for the positive return of the gear 4, and parts carried thereby, to their initial or zero position. Furthermore, this time interval provides for the rebound which occurs to a greater or less extent between the stops 8 and 9, thus allowing the stop 8 to come to rest against the stop 9 before the gear 10 is again brought into mesh with the gear 4.

After the operation just described, the cams 43 and 45 are further rotated in the direction indicated by the arrow and the notch 51 passes the lug 42 just before the cam surface 54 engages the lug 46 to move the lever 47 back to the position indicated in Fig. 1. A delay surface on the cam 45 separates the shoulder 53 from the cam surface 54 and this delay surface is of sufficient extent to permit the notch 51 to pass the lug 42 before the arm 50 is moved to the left from engagement with the upper end of the lever 11. The extent of the notch 51 in the cam 43 and the corresponding delay surface on the cam 45 is of comparatively small moment, the essential feature of this construction being the displacement of the leading shoulder of the notch 51 relatively to the shoulder 53, so that the lug 42 will drop into the notch 51 a short predetermined time interval before the lug 46 drops off the shoulder 53. It is apparent that by adjusting the cams 43 and 45 angularly relatively to each other upon the shaft 44, this time interval may be given any desired value as long as it is not a considerable part of the time of one rotation of the shaft 44 and the cams carried thereby.

It will be understood that the operation of the levers 11 and 47, referred to above, will occur once for each rotation of the shaft 44 and by rotating this shaft at any desired rate, as once in fifteen minutes, or once in thirty minutes, or any other desired time interval, the gear 4 will be released at the end of each fifteen minutes' interval, or thirty minute interval, or other desired time interval corresponding to the operation of the shaft 44. It is immaterial what means is employed to drive the shaft 44 as long as it is uniformly rotated to secure the desired time intervals of operation of the gear 4 and parts carried thereby, and in the drawings I have illustrated diagrammatically in Fig. 2 the clock-work mechanism 55 as constituting the driving means. It will, of course, be understood that by using proper gearing between the shaft 44 and the clockwork mechanism, any desired rate of operation of the shaft 44 may be secured.

It will be understood that I do not limit myself to any particular form of mechanism for accomplishing the results described as my invention includes any equivalent devices to those shown for securing the same results in substantially the same way. The essential feature of operation of the timing mechanism is that one device shall release the gear train and move, or cause the movement of a part of said train to an inoperative position, while a second device operates subsequently to quickly and positively cause the gear train to again assume its operative condition.

It will be understood that the pointer 2 may be moved back to its zero position at the end of any desired interval, as, for example, every week or every month, or, under some conditions, every day, by an attendant, and the device may thus be caused to indicate accurately the maximum current or energy flowing through the measured circuit during one of the predetermined shorter time intervals during the said week, or month, or day, as the case may be. It will further be understood that the brief interval of disengagement between the gears 4 and 10 does not afford an opportunity for much, if any, error, since the probability of the disengagement occurring simultaneously with the energization of the solenoid is remote, and, furthermore, each operation of the solenoid represents a very small amount of the total possible operation of the pointer 2 during any one of the time intervals predetermined by the cams 43 and 45. Furthermore, the only possibility of an error in the operation of the device occurs during one of the time intervals when the pointer is being advanced by the pin 6 at the end of the interval and, even in this case, an error will not occur unless the energization of the solenoid occurs simultaneously with the disengagement of the gears 4 and 10.

What I claim is:

1. In a maximum indicating mechanism, the combination of an electricity meter, a maximum demand indicating device, a gear train for advancing said device, electromagnetic mechanism for actuating said gear train, circuit connections extending from said electromagnetic mechanism to said meter, and mechanism for controlling the gear train comprising a first lever for moving a gear of said train from operative position, a spring tending to move said lever to a position in which said gear is out of operative position, a cam engaging said lever to determine the operation of said spring, a second lever for moving said first lever against the action of said spring to bring the gear controlled by said first lever again into operative relation, a second spring stronger than said first spring for thus moving said second lever, a second cam for determining the operation of said second lever, and time-controlled mechanism for operating said cams.

2. In a mechanism for indicating the maximum consumption of electricity, the combination of a meter, a maximum indicating device, a gear train for operating said device, connections extending from the meter for operating the gear train proportionally to the operation of the meter, and mechanism for controlling the gear train comprising a first lever for moving a gear of said train from operative position, a spring tending to move said lever such that said gear assumes an inoperative position, a cam engaging said lever to determine the operation of said spring, a second lever for moving said first lever against the action of said spring to bring the gear controlled by said first lever again into operative relation, a second spring stronger than said first spring for thus moving said second lever, a second cam for determining the operation of said second lever, and time-controlled mechanism for operating said cams.

3. In a mechanism for indicating the maximum consumption of electricity during one of recurring time intervals, the combination of a maximum indicating device, a gear train for operating said device, and mechanism for interrupting said gear train comprising a first lever for moving a gear of said train from operative position, a spring tending to move said lever such that said gears will assume an inoperative position, a cam engaging said lever to determine the operation of said spring, a second lever for moving said first lever against the action of said spring to bring the gear controlled by said first lever again into operative relation, a second spring stronger than said first spring for thus moving said second lever, a second cam for determining the operation of said second lever, and time-controlled mechanism for operating said cams.

4. In a mechanism for indicating the maximum consumption of electricity, the combination of a meter, a maximum indicating device, a gear train for operating said device, connections extending from the meter for operating the gear train proportionally to the operation of the meter, and mechanism for controlling the gear train comprising a first lever for moving a gear of said train from operative position, a spring tending to move said lever such that said gear is moved to an inoperative position, a cam engaging said lever to determine the operation of said spring, a second lever for moving said first lever against the action of said spring to bring the gear controlled by said first lever again into operative relation, a second spring stronger than said first spring for thus moving said second lever, a second cam for determining the operation of said second lever, and time-controlled mechanism for operating said cams, said first-named cam having a sustaining surface for positively maintaining the gear train in operative condition when said interrupting mechanism is not operative.

5. In a mechanism for indicating the maximum consumption of electricity during one of recurring time intervals, the combination of a maximum indicating device, a gear train for operating said device, and mechanism for controlling said gear train comprising a first lever for moving a gear of said train from operative position, a spring tending to move said lever such that said gear will move to an inoperative position, a cam engaging said lever to determine the operation of said spring, a second lever for moving said first lever against the action of said spring to bring the gear controlled by said first lever again into operative relation, a second spring stronger than said first spring for thus moving said second lever, a second cam for determining the operation of said second lever, and time-controlled mechanism for operating said cams, said first-named cam having a sustaining surface for positively maintaining the gear train in operative condition when said interrupting mechanism is not operative.

In witness whereof, I hereunto subscribe my name this 23rd day of October, A. D. 1913.

CHESTER I. HALL.

Witnesses:
ALBERT C. BELL,
LEONARD E. BOGUE.